(12) United States Patent
Wang

(10) Patent No.: US 7,496,940 B2
(45) Date of Patent: Feb. 24, 2009

(54) TRAVERSE MODULE FOR DISC APPARATUS WITH TILT ADJUSTABLE SPINDLE MOTOR

(75) Inventor: Yen-Wen Wang, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 385 days.

(21) Appl. No.: 11/308,909

(22) Filed: May 25, 2006

(65) Prior Publication Data
US 2007/0089121 A1   Apr. 19, 2007

(30) Foreign Application Priority Data
Oct. 18, 2005   (CN)  .......................... 2005 1 0100490

(51) Int. Cl.
*G11B 17/028*   (2006.01)
(52) U.S. Cl. .................................................... 720/697
(58) Field of Classification Search ................ 720/697, 720/698, 692, 685, 635, 715; 360/97.02; 369/248
See application file for complete search history.

(56) References Cited

U.S. PATENT DOCUMENTS

| | | | | |
|---|---|---|---|---|
| 5,602,697 A  * | 2/1997 | Jeong et al. | ............... | 360/97.02 |
| 5,793,566 A  * | 8/1998 | Scura et al. | ............... | 360/97.02 |
| 6,005,836 A | 12/1999 | Choi | | |
| 6,072,767 A | 6/2000 | Iwazawa | | |
| 6,772,428 B2 | 8/2004 | Kim et al. | | |
| 7,028,319 B2 * | 4/2006 | Wang | ......................... | 720/700 |
| 2005/0081227 A1 * | 4/2005 | Chuang | ......................... | 720/700 |
| 2005/0289574 A1 * | 12/2005 | Yamauchi et al. | ........... | 720/651 |
| 2006/0158777 A1 * | 7/2006 | Kim et al. | ................. | 360/98.08 |

* cited by examiner

*Primary Examiner*—Allen T Cao
(74) *Attorney, Agent, or Firm*—Winston Hsu

(57) ABSTRACT

A traverse module for a disc apparatus includes a chassis, a spindle motor for rotating a disc thereon, a gasket set positioned between the spindle motor and the chassis; and a screw set corresponding to the gasket set. The spindle motor is mounted on the chassis. The screw set adjustably secures the spindle motor and the chassis via the gasket set.

17 Claims, 4 Drawing Sheets

TRAVERSE MODULE FOR DISC APPARATUS WITH TILT ADJUSTABLE SPINDLE MOTOR

FIELD OF THE INVENTION

The present invention generally relates to disc apparatus and, more particularly, to a disc apparatus with a tilt adjustable spindle motor.

DESCRIPTION OF RELATED ART

In general, a device using a disc as a recording medium, such as a laser disc (LD), a compact disc (CD), a video compact (VCD), and a digital video disc (DVD), has been never ceased developing. In order to store more information on a disc in a same recording area, a width of a recording track of the disc is narrowed and a distance between two adjacent tracks is decreased. Thus, an accurate optical pickup and an accurate deck mechanism corresponding thereto are required to accurately record information on and/or reproduce information from the high density disc.

To maintain the accurate deck mechanism, the optical pickup should be tilt free. Tilting causes a light beam to be projected from the optical pickup to the disc at an undesirable angle. The types of tilts include radial tilts when light beams are projected at an angle in radial to the disc, and tangential tilts when light beams are projected at an angle tangential to the disc.

As the disc is mounted on a spindle motor, the spindle motor should be parallely mounted on the deck mechanism to ensure no tilts of the optical pickup and the disc exist.

Accordingly, a need exists for a disc apparatus with a tilt adjustable spindle motor in the industry.

SUMMARY OF THE INVENTION

A traverse module for a disc apparatus includes a chassis, a spindle motor for rotating a disc thereon, a gasket set positioned between the spindle motor and the chassis; and a screw set corresponding to the gasket set. The spindle motor is mounted on the chassis. The screw set adjustably secures the spindle motor and the chassis via the gasket set.

A traverse module for a disc apparatus includes a chassis, a spindle motor for rotating a disc thereon, and a tilt adjusting mechanism for securing the spindle motor to the chassis and adjusting the spindle motor. The spindle motor is mounted on the chassis. The tilt adjusting mechanism includes an elastic gasket set supporting the spindle motor on the chassis, and a fastener set adjustably securing the spindle motor to the chassis via the elastic gasket set. The elastic gasket set is used for damping vibration of the spindle motor and isolating vibration transmission between the spindle motor and the chassis.

Other systems, methods, features, and advantages of the present traverse module will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present traverse module can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe the preferred embodiments of the present traverse module, in detail.

Figure 1:
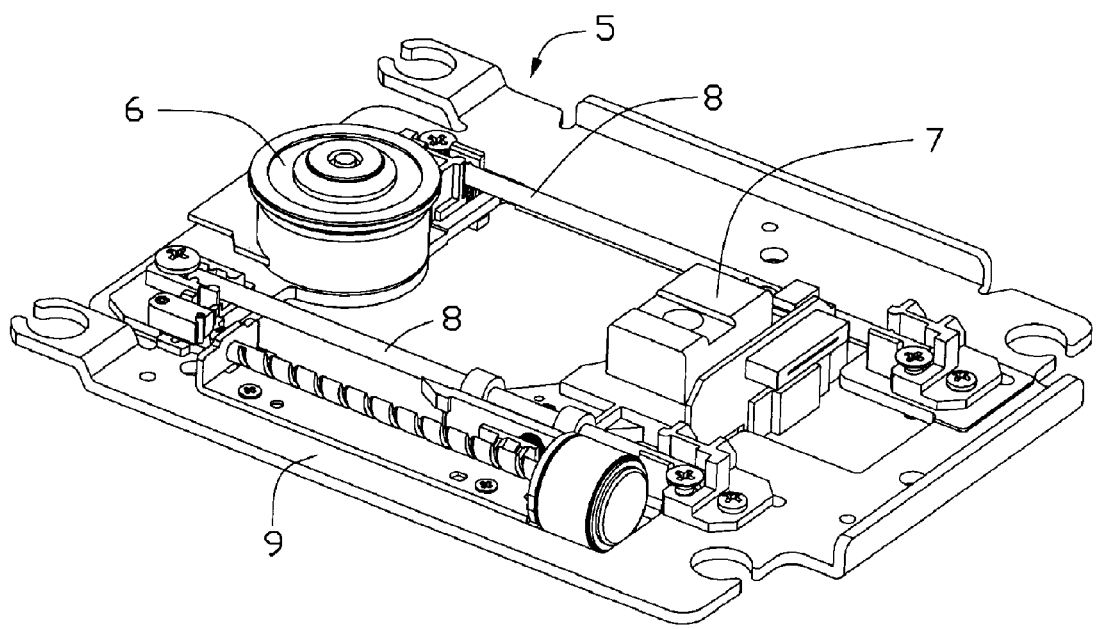
FIG. 1 is an isometric view of a typical traverse module for a disc apparatus.

Referring to FIG. 1, a typical traverse module 5 includes a spindle motor 6, a pickup head 7, a pair of guiding rods 8, and a chassis 9. The spindle motor 6, the pickup head 7, and the guiding rods 8 are all mounted on the chassis 9. The spindle motor 6 is secured to a side of the chassis 9, while the guiding rods 8 are parallely fixed next to the spindle motor 6 to allow the pickup head 7 to reciprocate therealong.

The spindle motor 6 rotates a disc (not shown) placed thereon, and the guiding rods 8 guide the pickup head 7 to move radially with respect to the disc to reproduce information recorded on the disc. During reproduction, the pickup head 7 emits a light beam that subsequently converges to form a spot on a recording surface of the disc. The light beam is modulated by the information recorded on the disc, and the modulated light beam returns to the pickup head 7 by reflection of the recording surface. The pickup head 7 receives the modulated light beam, and transforms the modulated light beam into electric signals to reproduce the recorded information.

In the above structure, an optical axial of the emitted laser beam should be perpendicular to the recording surface of the disc to accurately reproduce the recorded information. Therefore, parallelism between a rotating surface where the disc rotates and an actuating surface of the pickup head 7 where the pickup head 7 moves should satisfy a regulated tolerance standard. Besides, a perpendicular distance between the rotating surface and the actuating surface should be within a regulated tolerance. Accordingly, after a prep assembly of the traverse module 5, the spindle motor 6 whose position determines a position of the rotating surface and/or the pickup head 7 whose position determines a position of the actuating surface, should be precisely adjusted to satisfy the above-mentioned requirements. As the pickup head 7 and the spindle motor 6 are both mounted on the chassis 9, the chassis is utilized as an intermediate reference during the adjustment.

Figure 2:
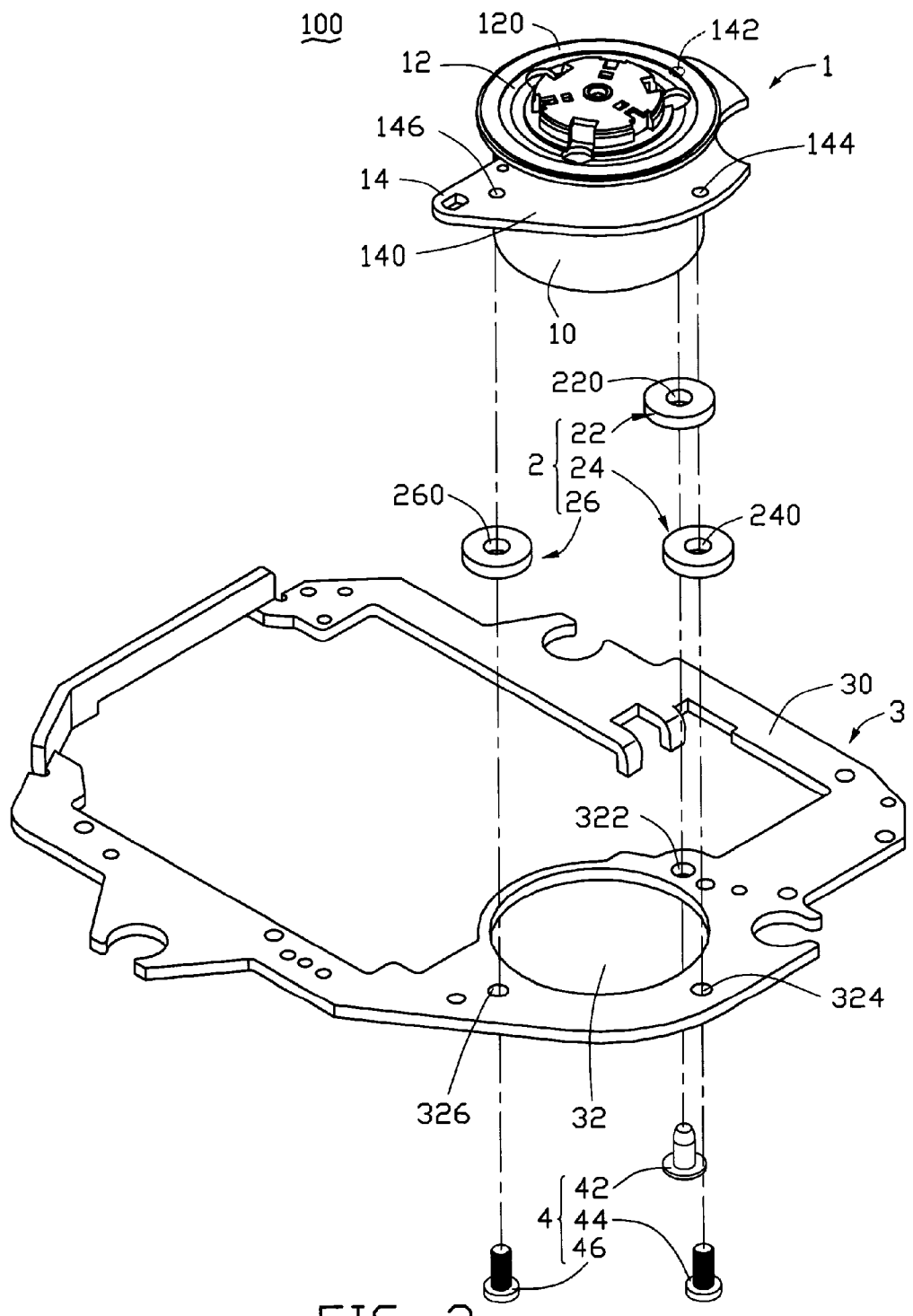
FIG. 2 is an exploded view of a traverse module in accordance with an exemplary embodiment.

Referring to FIG. 2, a traverse module 100 in accordance with an exemplary embodiment is illustrated. The traverse module 100 includes a spindle motor 1, a gasket set 2, a chassis 3, and a screw set 4. The spindle motor 1 is fixed to the chassis 3 via the gasket set 2 by the screw set 4.

The spindle motor 1 includes a motor body 10, a turntable 12 for rotating a disc thereon, and a motor deck 14 for securing the spindle motor to the chassis 3. The turntable 12 is perpendicularly secured to and rotates together with a spindle (not shown) of the motor body 10. The turntable 12 defines a rotating plane 120 where the disc mounted onto the turntable rotates. The motor deck 14 is secured to the motor body 10, and defines a first screw hole 142, a second screw hole 144, and a third screw hole 146. The motor deck 14 defines a deck plane 140 substantially parallel to the rotating plane 120.

The gasket set 2 includes three gaskets, a first gasket 22, a second gasket 24, and a third gasket 26 respectively corresponding to the first screw hole 142, the second screw hole 144, and the third screw hole 146. The first gasket 22, the second gasket 24, and the third gasket 26 respectively define a first central hole 220, a second central hole 240, and a third central hole 260. The first, second, and third gaskets 22, 24, and 26 are circular, and have a same height. In order to provide adjustability, the first, second, and third gaskets 22, 24, and 26 are made of a rubber material. Rubber materials are resilient with superior damping characteristic.

The chassis 3 is a supporting frame of the traverse module 100, and defines a through hole 32 at a lateral side and three mounting holes 322, 324, and 326 surrounding the through hole 32. The three mounting holes, a first mounting hole 322, a second mounting hole 324, and a third mounting hole 326, respectively correspond to the first screw hole 142, the second screw hole 144, and the third screw hole 146. The chassis 3 defines a base plane 30 that is utilized as a reference plane for tilt adjustments of the spindle motor 1.

The screw set 4 includes a first screw 42, a second screw 44, and a third screw 46 respectively correspond to the first screw hole 142, the second screw hole 144, and the third screw hole 146.

Figure 3:
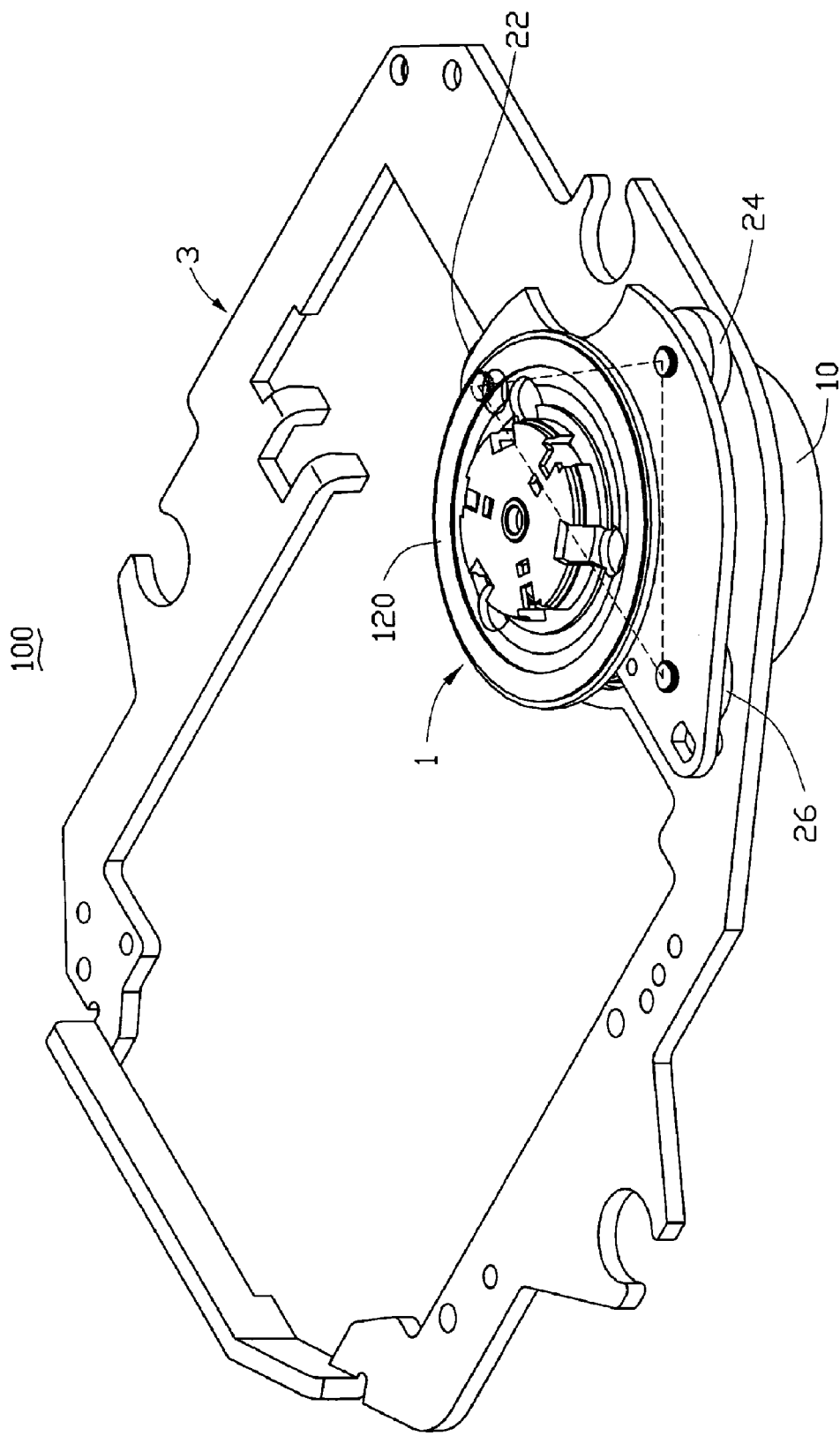
FIG. 3 is an assembled, isometric view of the traverse module of FIG. 1.
Figure 4:
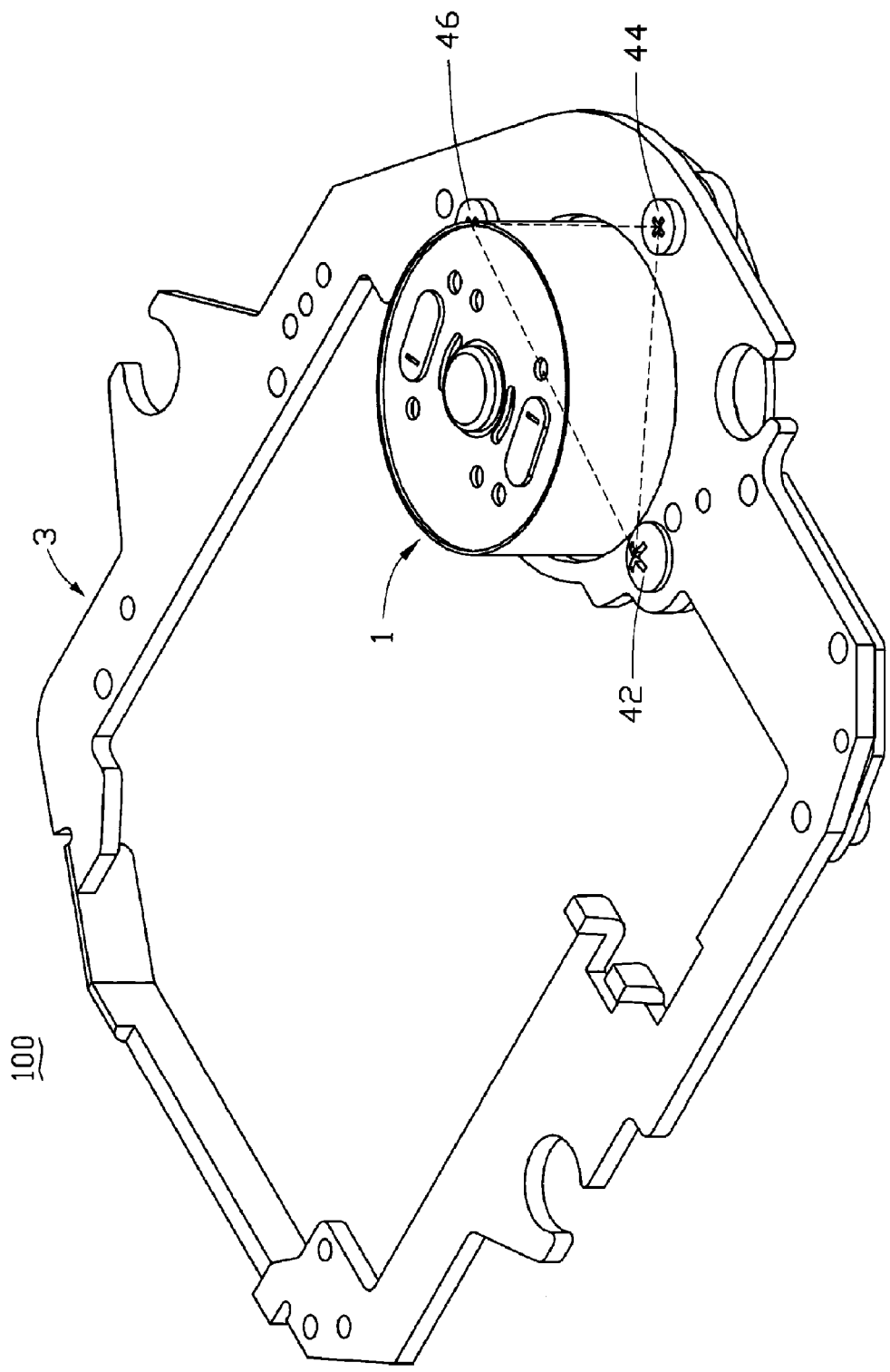
FIG. 4 is similar to FIG. 3, viewed form a rear aspect.

Also referring to FIG. 3 and FIG. 4, assembly and adjustment procedures of the traverse module 100 will be detailedly described.

During assembly, the spindle motor 1 is positioned on chassis 3, with the motor body 10 extending through the through hole 32 of the chassis 3. The first, second, and third gaskets 22, 24, and 26 are inserted between the motor deck 14 and the chassis 3. Axes of the first mounting hole 322, the first central hole 220, and the first screw hole 142 are aligned, in order to insert the first screw 42 therealong. In the same way, axes of the second mounting hole 324, the second central hole 240, and the second screw hole 144 are aligned to allow the second screw 44 to insert therealong, and axes of the third mounting hole 326, the third central hole 260, and the third screw hole 146 are aligned to allow the third screw 46 to insert therealong. The first, second, and third screws 42, 44, and 46 are respectively screwed into the first, second, and third screw holes 142, 144, and 146 to secure the spindle motor 1 to the chassis 3. The prep assembly is accomplished.

After the above prep assembly, the traverse module 100 is ready for adjustments. In the adjustment procedure, a position of the rotating plane 120 of the spindle motor 1, relative to the base plane 32 of the chassis 3, is adjusted to satisfy a parallelism tolerance standard. The first screw 42 is firstly adjusted to a certain position, with the first gasket 22 compressed between the motor deck 14 and the chassis 3. The second gasket 24 and the third gasket 26 are subsequently adjusted by a screwing depth of the second screw 44 and the third screw 46, thereby adjusting a position of the deck plane 140 of the spindle. As the deck plane 140 is parallel to the rotating plane 120, a tilt adjustment of the rotating plane 120 is thus accomplished.

A first dashed triangle is shown in FIG. 3 which is constructed by interconnecting centers of the first, second, and third screw holes 142, 144, and 146, defining a first plane. A second dashed triangle shown in FIG. 4 which is constructed by interconnecting centers of the first, second, and third mounting holes 322, 324, and 326, defining a second plane. The first plane is parallel to the rotating plane 120, and the second plane is parallel to the base plane 30. Each of the first, second, and third screws 42, 44, and 46 determines a distance between a vertex of the first dashed triangle and a corresponding vertex of the second triangle. That is, the first, second, and third screws 42, 44, and 46 determine the parallelism and the distance between the first plane and the second plane. The parallelism and the distance of the rotating plane 120 and the base plane 30 is thus determined.

The gasket set 2 between the spindle motor 1 and the chassis 3 not only supports the spindle motor 1, but also damps vibrations of the spindle motor 1 and isolates vibration transmission between the spindle motor 1 and the chassis 3 due to the superior damping characteristic thereof. It provides the traverse module 100 a steady working environment.

In alternative embodiments, the first screw 42 may be substituted with a rivet, and the first screw hole 142 may be substituted with a rivet hole accordingly. The rivet has a predetermined height that satisfies the requirement of the distance between the first plane and the second plane is fixed in the rivet hole to confirm a vertex of the first dashed triangle and a corresponding vertex of the second dashed triangle. It only needs to adjust the second and third screws 44, 46 to ensure the parallelism of the first plane and the second plane.

It should be emphasized that the above-described embodiments of the present invention, including any preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and be protected by the following claims.

What is claimed is:

1. A traverse module for a disc apparatus, comprising:
   a chassis;
   a spindle motor for rotating a disc thereon, the spindle motor being mounted on the chassis;
   a gasket set positioned between the spindle motor and the chassis, the gasket set comprising three gaskets; and
   a screw set corresponding to the gasket set, the screw set securing the spindle motor and the chassis, and adjusting a tilt of the spindle motor via the three gaskets of the gasket set.

2. The traverse module as claimed in claim 1, wherein the gasket set is made of rubber.

3. The traverse module as claimed in claim 2, wherein the screw set comprises three screws, the tilt of the spindle motor are adjusted by independently adjusting the three gaskets by the three screws correspondingly.

4. The traverse module as claimed in claim 2, wherein the screw set comprises a rivet and two screws.

5. The traverse module as claimed in claim 2, wherein the spindle motor comprises a turntable for rotating the disc thereon, and the turntable defines a rotating plane where the disc rotates.

6. The traverse module as claimed in claim 5, wherein the spindle motor further comprises a motor deck for securing the spindle motor to the chassis, and the motor lies on a deck plane parallel to the rotating plane.

7. The traverse module as claimed in claim 6, wherein the motor deck defines three holes therein for receiving the screw sets, and the three holes non-linearly lies in the motor deck.

8. A traverse module for a disc apparatus, comprising:
   a chassis;
   a spindle motor for rotating a disc thereon, the spindle motor being mounted on the chassis; and
   a tilt adjusting mechanism for securing the spindle motor to the chassis and adjusting the spindle motor, the tilt adjusting mechanism comprising:

an elastic gasket set supporting the spindle motor on the chassis for damping vibrations of the spindle motor and isolating vibration transmissions between the spindle motor and the chassis; and a fastener set adjustably securing the spindle motor to the chassis via the elastic gasket set.

9. The traverse module as claimed in claim 8, wherein the elastic gasket set is made of rubber.

10. The traverse module as claimed in claim 8, wherein the gasket set comprises three non-linearly lying gaskets.

11. The traverse module as claimed in claim 8, wherein the fastener set comprises at least two screws that extend through the gasket set and adjustably compresses the gasket set between the spindle motor and the chassis.

12. The traverse module as claimed in claim 11, wherein the fastener set comprises a rivet extending through the gasket set and securing the chassis and the spindle motor together.

13. The traverse module as claimed in claim 8, wherein the spindle motor comprises a turntable for positioning and rotating the disc thereon.

14. The traverse module as claimed in claim 13, wherein the spindle motor further comprises a motor deck parallel to the turntable.

15. The traverse module as claimed in claim 14, wherein the motor deck defines three screw holes therein allowing the fastener set to be received therein.

16. The traverse module as claimed in claim 8, wherein the chassis defines a through hole allowing the spindle motor to extend therethrough.

17. The traverse module as claimed in claim 16, wherein the chassis further defines three mounting holes surrounding the through hole, and the three mounting holes allow the fastener set to extend therethrough.

* * * * *